US006977466B2

(12) United States Patent
Eom

(10) Patent No.: US 6,977,466 B2
(45) Date of Patent: Dec. 20, 2005

(54) FLAT LAMP FOR EMITTING LIGHTS TO A SURFACE AREA AND LIQUID CRYSTAL DISPLAY USING THE SAME

(75) Inventor: Sun Kwan Eom, Daejon-Kwangyokshi (KR)

(73) Assignee: LG.Philips LCD Co., Ltd., Seoul (KR)

( * ) Notice: Subject to any disclaimer, the term of this patent is extended or adjusted under 35 U.S.C. 154(b) by 0 days.

(21) Appl. No.: 10/842,575

(22) Filed: May 11, 2004

(65) Prior Publication Data

US 2004/0208000 A1    Oct. 21, 2004

Related U.S. Application Data

(62) Division of application No. 09/893,988, filed on Jun. 29, 2001, now Pat. No. 6,765,633.

(30) Foreign Application Priority Data

Oct. 31, 2000    (KR) ............................... 2000-64335

(51) Int. Cl.[7] .................. H01J 11/00; H01J 17/00; H01J 61/00; H01J 61/28; H01J 1/50
(52) U.S. Cl. ..................... 313/567; 313/582
(58) Field of Search ................. 313/495–97, 567, 313/582, 609–12; 349/69–71

(56) References Cited

U.S. PATENT DOCUMENTS

| 5,276,378 | A | 1/1994 | Gothard |
| 5,313,223 | A | 5/1994 | Buzak et al. |
| 5,343,116 | A | 8/1994 | Winsor |
| 5,596,431 | A | 1/1997 | Bongaerts et al. |
| 5,627,431 | A | 5/1997 | Hayashi |
| 5,777,431 | A | 7/1998 | Maya et al. |
| 5,850,122 | A | 12/1998 | Winsor |
| 5,984,747 | A | 11/1999 | Bhagavatula et al. |
| 6,011,354 | A | 1/2000 | Tsai et al. |
| 6,016,032 | A | 1/2000 | Buzak et al. |
| 6,060,827 | A | 5/2000 | Kichimi et al. |
| 6,114,809 | A | 9/2000 | Winsor |
| 6,169,364 | B1 | 1/2001 | Van Slooten et al. |
| 6,229,582 | B1 | 5/2001 | Van Slooten |
| 6,373,185 | B1 | 4/2002 | Tyler |
| 6,400,423 | B1 | 6/2002 | French |
| 6,765,633 | B2 * | 7/2004 | Eom ........................ 349/69 |

* cited by examiner

Primary Examiner—Jerome Jackson
Assistant Examiner—Edgardo Ortiz
(74) Attorney, Agent, or Firm—Morgan, Lewis & Bockius LLP

(57) ABSTRACT

A flat lamp for emitting light to a surface area of a liquid crystal display device includes a bottom having a channel uniformly crossing an entire surface of the bottom, an arc-discharging gas is disposed within the channel, a cover disposed upon an upper junction surface of the bottom, the cover is coated with a fluorescent material, and an electric field generating means for generating an electric field, wherein the electric field generating means is placed along opposing lateral sides of the channel.

7 Claims, 7 Drawing Sheets

FLAT LAMP FOR EMITTING LIGHTS TO A SURFACE AREA AND LIQUID CRYSTAL DISPLAY USING THE SAME

This is a divisional of application Ser. No. 09/893,988, filed on Jun. 29, 2001 U.S. Pat. No. 6,765,633.

This application claims the benefit of Korean Patent Application No. 2000-64335, filed on Oct. 31, 2000 in Korea, which is hereby incorporated by reference.

BACKGROUND OF THE INVENTION

1. Field of the Invention

The present invention relates to a flat lamp for emitting light to a surface area, and more particularly to a liquid crystal display using a flat lamp for emitting light to reduce delay time for lamp turn-on despite low voltage and to extend life-span of the lamp.

2. Background of the Related Art

Generally, lamps are classified into two categories according to the principles of generating light used as a light source: glow lamps and fluorescent lamps, A flat lamp belongs to the fluorescent lamps category since the flat lamp generates visible light rays by fluorescence in which ultraviolet rays produced by glow discharge within the lamp stimulate fluorescent materials.

Presently, flat lamps are implemented as light sources for liquid crystal display (LCD) devices. Since LCD devices are non-luminous and display images by controlling the amount of light transmitted through a liquid crystal layer, LCD devices need additional light sources, i.e., backlight assemblies, for displaying images.

Exemplary light sources used for backlight assemblies may be classified into different categories: a point light source of a white halogen lamp, a linear light source of a fluorescent lamp, a plane light source of an electro-luminescent (EL) device or light emitting diode.

However, the light source used in conventional backlight assemblies is a linear light source using a cold cathode fluorescence lamp (CCFL) that requires additional features such as a light guiding plate, a diffusion plate, and a prism sheet, for example, for producing a uniform plane of light to a display surface.

An exemplary solution to solve the above problem is a flat lamp enabled to uniformly emit light to a surface area a planar light source.

One example of a flat lamp for emitting light to a surface area is disclosed in U.S. Pat. No. 5,777,431, which is explained hereinafter.

FIG. 1 shows a plan view of a flat lamp for emitting light to a surface area according to U.S. Pat. No. 5,777,431, wherein the cover is omitted.

As shown in FIG. 1, a volute channel 6 is formed by an internal bulkhead 3 and an external bulkhead 2, wherein the internal bulkhead 3 has a same height as the external bulkhead 2 from a rectangular bottom 1. A cathode 4 emitting electrons is placed at an end of the internal bulkhead 3 that adjoins with the external bulkhead 2. An anode 5 is disposed at a center portion of the bottom 1 and a gas is injected into the channel 6 for arc-discharging. The volute channel 6 has a spiral shape that terminates at a center portion of the bottom 1, whereby electrodes emitted from the cathode 4 travel toward the anode 5 in a counterclockwise direction.

In the flat lamp of FIG. 1, an electric field is generated when an electric potential is applied between the cathode 4 and the anode 5, whereby electrons are emitted from the cathode 4 to the anode 5. Accordingly, the electrons emitted from the cathode 4 migrate along the volute channel 6 and emit ultraviolet rays as a result of impacting with the arc-discharging gas. The ultraviolet rays then stimulate the fluorescent material to produce a glow discharge, thereby producing visible rays. Namely, the visible rays are emitted through the cover (not shown in the drawing) that is located at the tops of the internal bulkhead 3 and the external bulkhead 2 and disposed to overlie the entire surface area in which the channel is formed. As mentioned above, the flat lamp is used as an independent illuminator and as a backlight assembly when placed at a rear portion of a LCD device panel.

Unfortunately, the flat lamp has the cathode 4 and the anode 5 disposed at opposite ends of the volute channel 6. Accordingly, the flat lamp requires a long response time for producing visible light during the turning-on interval and requires a high voltage for sufficient luminescence. Such a high voltage inevitably reduces the life-span of the electrode of the cathode 4 and the anode 5, and hence, reduces the life-span of the flat lamp. Moreover, the total length of the volute channel 6 ultimately limits the total size of the lamp.

SUMMARY OF THE INVENTION

Accordingly, the present invention is directed to a flat lamp for emitting light and a liquid crystal display using a flat lamp that substantially obviates one or more of the problems due to limitations and disadvantages of the related art.

An object of the present invention is to provide a flat lamp for emitting light to reduce delay time for lamp turn-on despite low voltage and to extend the life-span of the lamp.

Additional features and advantages of the invention will be set forth in the description that follows and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a flat lamp includes a bottom having a channel uniformly crossing an entire surface thereof, an arc-discharging gas within the channel, a cover disposed upon an upper junction surface of the bottom, the cover coated with a fluorescent material, and an electric field generating means for generating an electric field, wherein the electric field generating means is placed along opposing lateral sides of the channel.

In another aspect, a liquid crystal display device includes a LCD panel, a backlight assembly disposed adjacent to the LCD panel, wherein the backlight unit includes a bottom having a channel uniformly crossing an entire surface thereof, an arc-discharging gas injected into the channel, a cover disposed on an upper junction surface of the bottom, and an electric field generating means for generating an electric field, wherein the electric field generating means is disposed along opposing lateral sides of the channel.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principles of the invention. In the drawings.

DETAILED DESCRIPTION OF THE PREFERRED EMBODIMENTS

Figure 1:
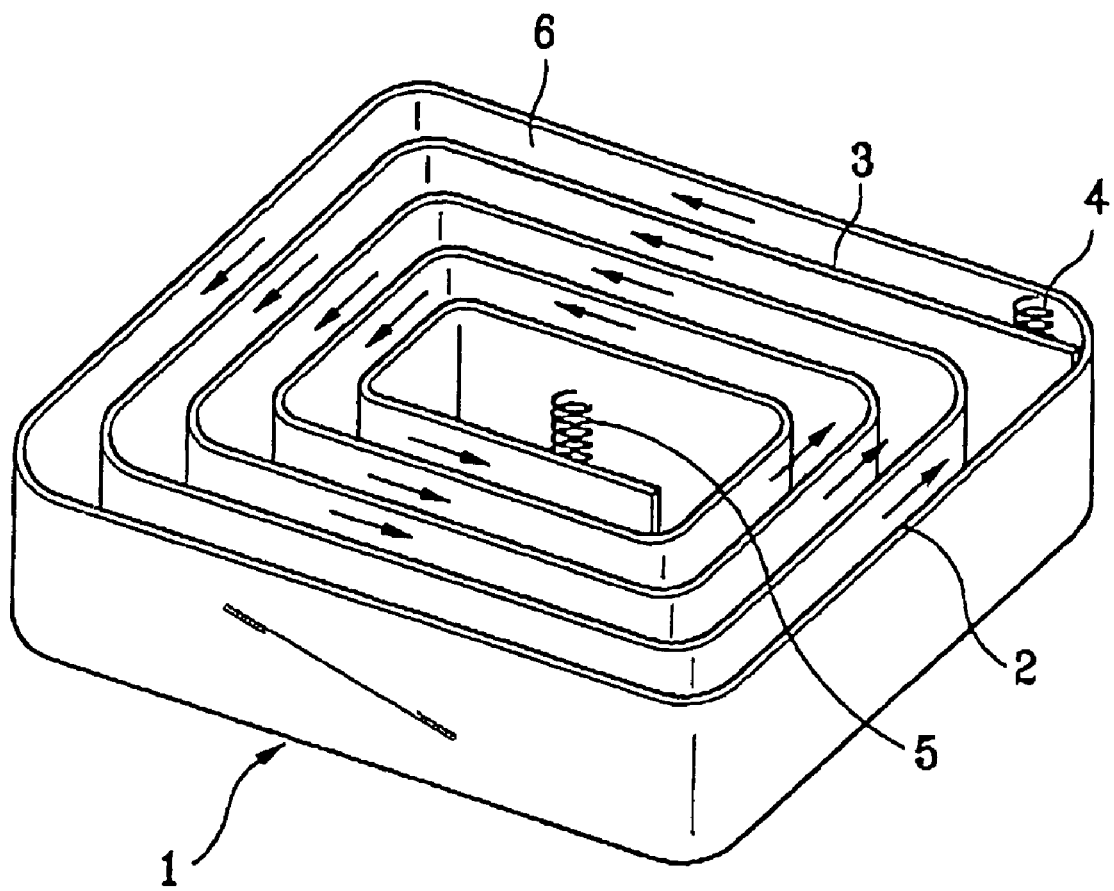
FIG. 1 shows a plan view of a flat lamp for emitting lights to a surface area according to the prior art.

Reference will now be made in detail to the illustrated embodiments of the present invention, examples of which are shown in the accompanying drawings. Where possible, the same reference numerals will be used throughout the drawings to refer to the same or like parts.

Figure 2:
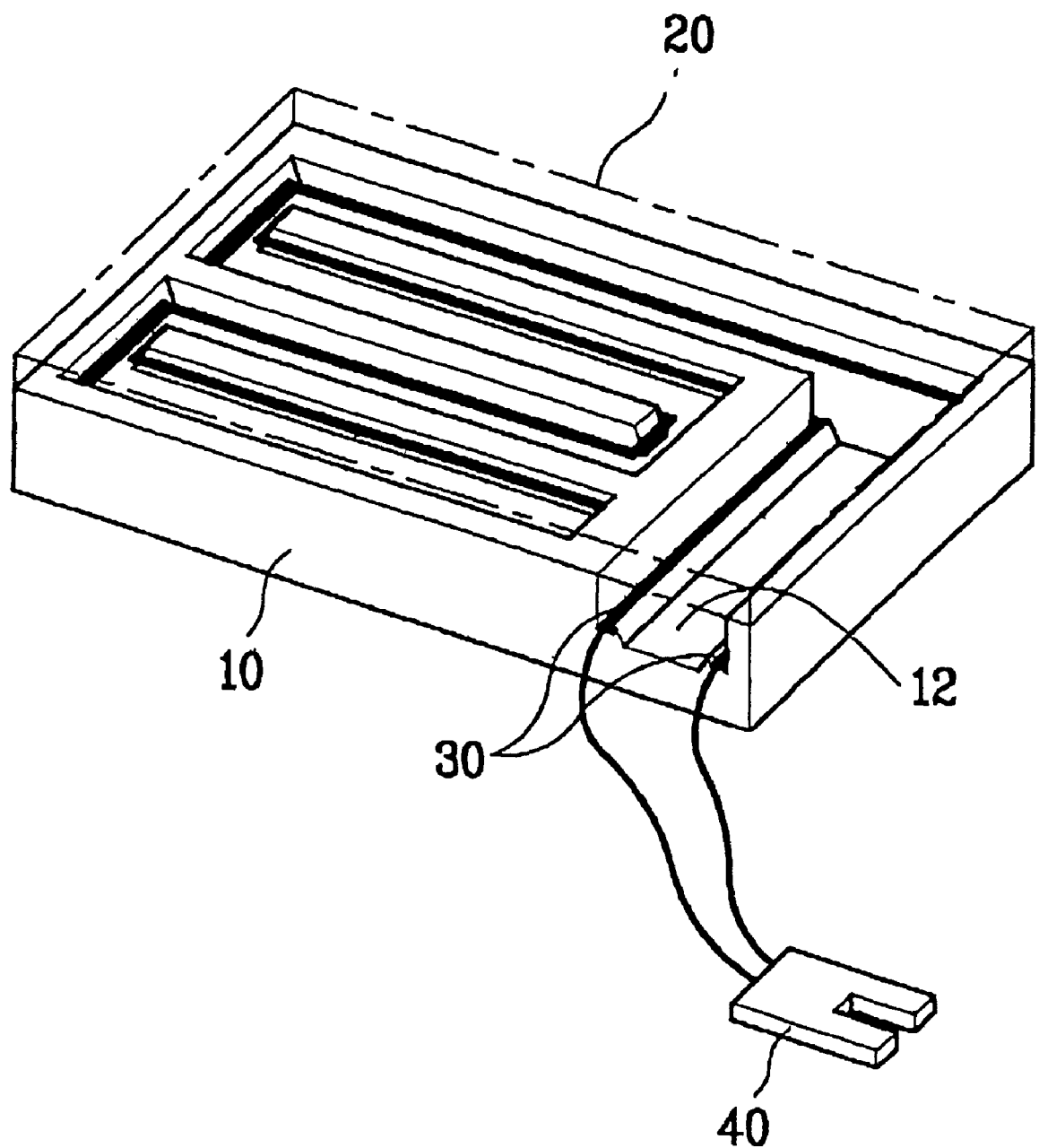
FIG. 2 shows a plan view of a flat lamp for emitting lights to a surface area according to an embodiment of the present invention.

FIG. 2 shows a plan view of a flat lamp for emitting lights to a surface area according to an embodiment of the present invention.

Referring to FIG. 2, the flat lamp comprises a rectangular-shaped planar cover 20 of which a rear side is coated with a fluorescent material to produce surface light, a bottom 10 that corresponds to the cover 20 and has a channel 12 into which an arc-discharging gas is injected, an electric field generating means 30 placed at opposite sides of the channel 12 to form an electric field, and a connector 40 for applying an external power supply to the electric field generating means 30. The channel 12 is a single connecting curve bent several times to cross an entire surface of the bottom 10 to provide a single open surface. An upper surface of the bottom 10 couples with a rear surface of the cover 20. The cover 20 may be formed of a glass material, a heat-resistance resin, a metal or an oxide.

The electric field generating means 30 comprises a pair of cathode and anode electrodes placed along opposite sides of the channel 12 to reduce the formation time of the electric field. Although FIG. 2 shows the electric field generating means 30 comprising wires, it may alternatively comprise a film or other known electric conductor structures. Additionally, the cover 20 may comprise glass or a heat-resistant resin in order to withstand any heat generated from the channel 12 as well as irradiate visible rays produced by the fluorescent material. The bottom 10 may be formed of a metal or an oxide.

Figure 3A:
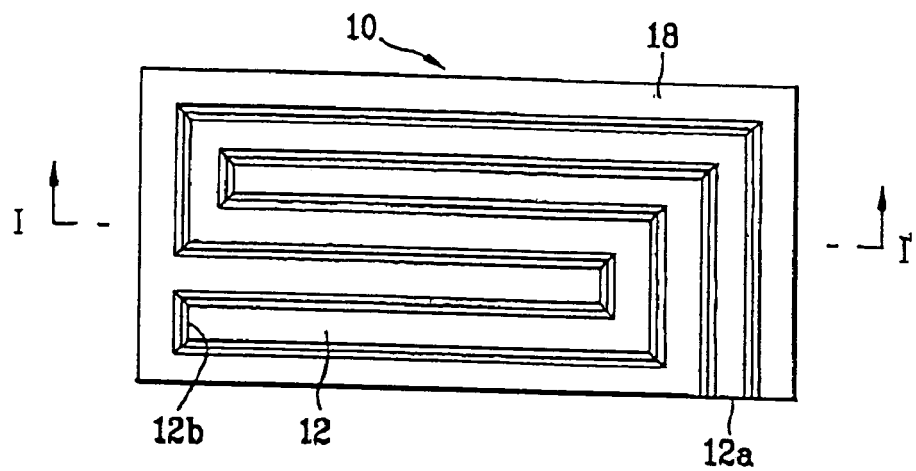
FIG. 3A shows a bottom of a flat lamp for emitting lights to a surface area according to an embodiment of the present invention.
Figure 3B:
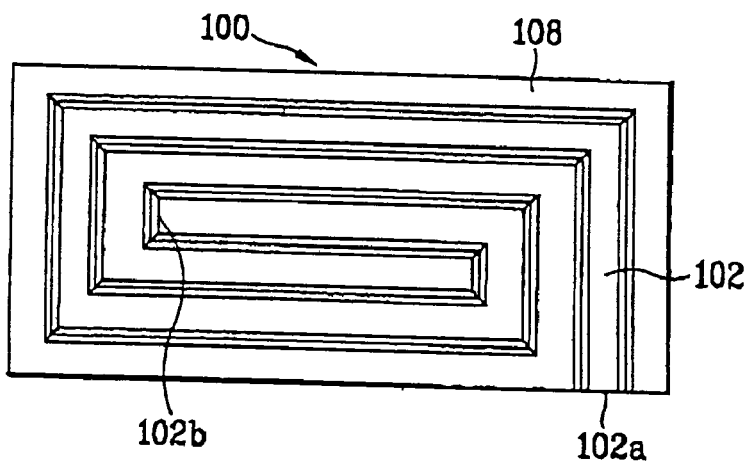
FIG. 3B shows a bottom of a flat lamp for emitting lights to a surface area according to an another embodiment of the present invention.
Figure 3C:
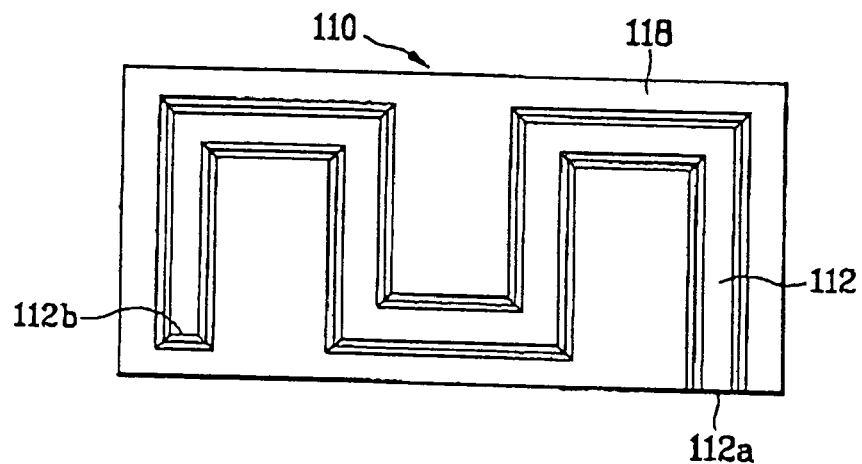
FIG. 3C shows a bottom of a flat lamp for emitting lights to a surface area according to another embodiment of the present invention.

FIGS. 3A, 3B, and 3C all show a bottom of a flat lamp for emitting lights to a surface area according to the present invention.

Referring to FIG. 3A, the channel 12 is alternately formed to be parallel with long and short sides of the bottom to provide glow discharge on a front surface of the bottom 10. For example, the channel 12 extends straight from an opening surface 12a at a lowermost long side of the bottom 10 along a rightmost short side of the bottom 10, continues along the lowermost long side and terminates at a closed surface 12, thereby creating an "S" shape. Accordingly, the shape of the channel 12 may not be limited to the "S" shape but may alternatively be shaped to evenly cross the entire surface of the bottom 10. Such alternative-shaped channels are shown in FIG. 3B and FIG. 3C.

Referring to FIG. 3B, a channel 102 has a volute shape extending in a counterclockwise direction along an outermost edge of the bottom from an opening surface 102a formed at a lowermost long side of the bottom 100 and terminating at a closed surface 102b at the center.

Referring to FIG. 3C, a channel 112 extends straight from an opening surface 112a at a lowermost long side of the bottom 110 along a rightmost short side of the bottom 110, continues along the leftmost short side and terminates at a closed surface 112b, thereby creating a "zig zag" or serpentine shape.

Figure 4A:
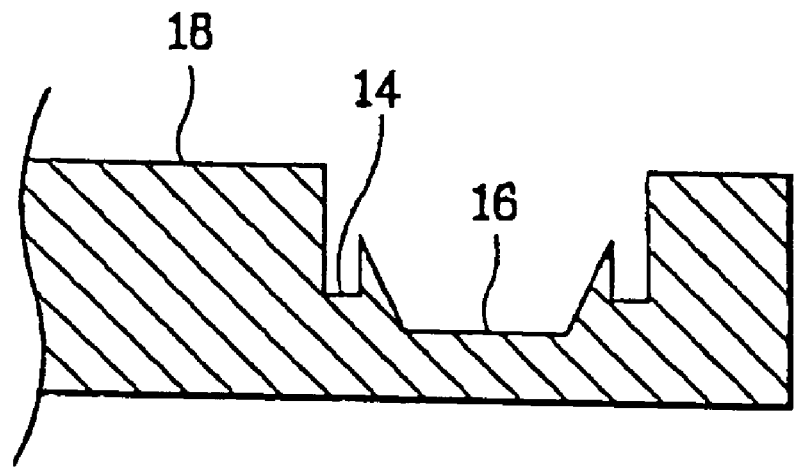
FIG. 4A shows a cross-sectional view of a channel of a flat lamp for emitting lights to a surface area along a line I–I' in FIG. 3A.
Figure 4B:
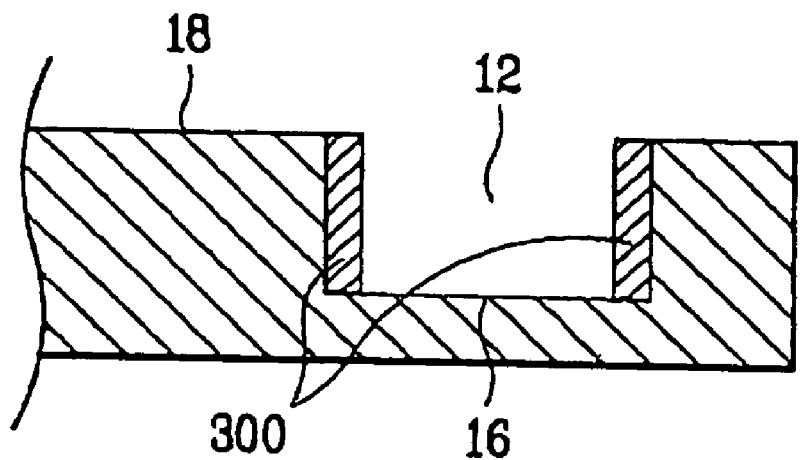
FIG. 4B shows a cross-sectional view of another channel of a flat lamp for emitting lights to a surface area.

FIG. 4A shows a cross-sectional view of the channel 12 along a line I–I' in FIG. 3A and FIG. 4B shows a cross-sectional view of another channel of a flat lamp according to an embodiment of the present invention.

Referring to FIG. 4A, wire-installing grooves 14 having a predetermined depth may be formed on opposite sides of the channel 12 to provided for the electric field generating means 30 (in FIG. 2). A cathode wire is formed in one of the wire-installing grooves 14 and an anode wire is formed in the opposing wire-installing groove 14. Accordingly, the predetermined depth of the wire-installing grooves 14 must be determined so as to not obscure the flow of electrons from the cathode to the anode. A bottom surface 16 between the wire-installing grooves 14 is formed deeper than the wire-installing grooves 14. Additionally, a reflection layer may be formed on the bottom surface 16 of the channel 12 (in FIG. 2) to enable effective production of light by the glow discharge. An uppermost surface of the bottom 10 becomes a junction surface 18 to be coupled with the cover.

Alternatively, referring to FIG. 4B, a film 300 may be applied to form an electric field generating means installed on opposite sides of the channel 12, thereby making the wire-installing grooves unnecessary. Instead, opposite sides of the channel 12 are coated with conductive films for forming the cathode and the anode. Additionally, a reflection layer may be formed on the bottom surface 16 of the channel 12 (in FIG. 2) to enable effective production of light by the glow discharge and an uppermost surface of the bottom 10 becomes a junction surface 18 to be coupled with the cover.

Processes of assembling a flat lamp for emitting light to a surface area may vary in accordance with the desired shapes of the channels and electric generating means. The following description is directed toward a process of assembling a flat lamp for the case in which wires are selected as the electric field generating means in the channel shown in FIG. 3A FIG. 5 shows a disassembled plan view of a flat lamp for emitting light to a surface area according to an embodiment of the present invention.

Figure 5:
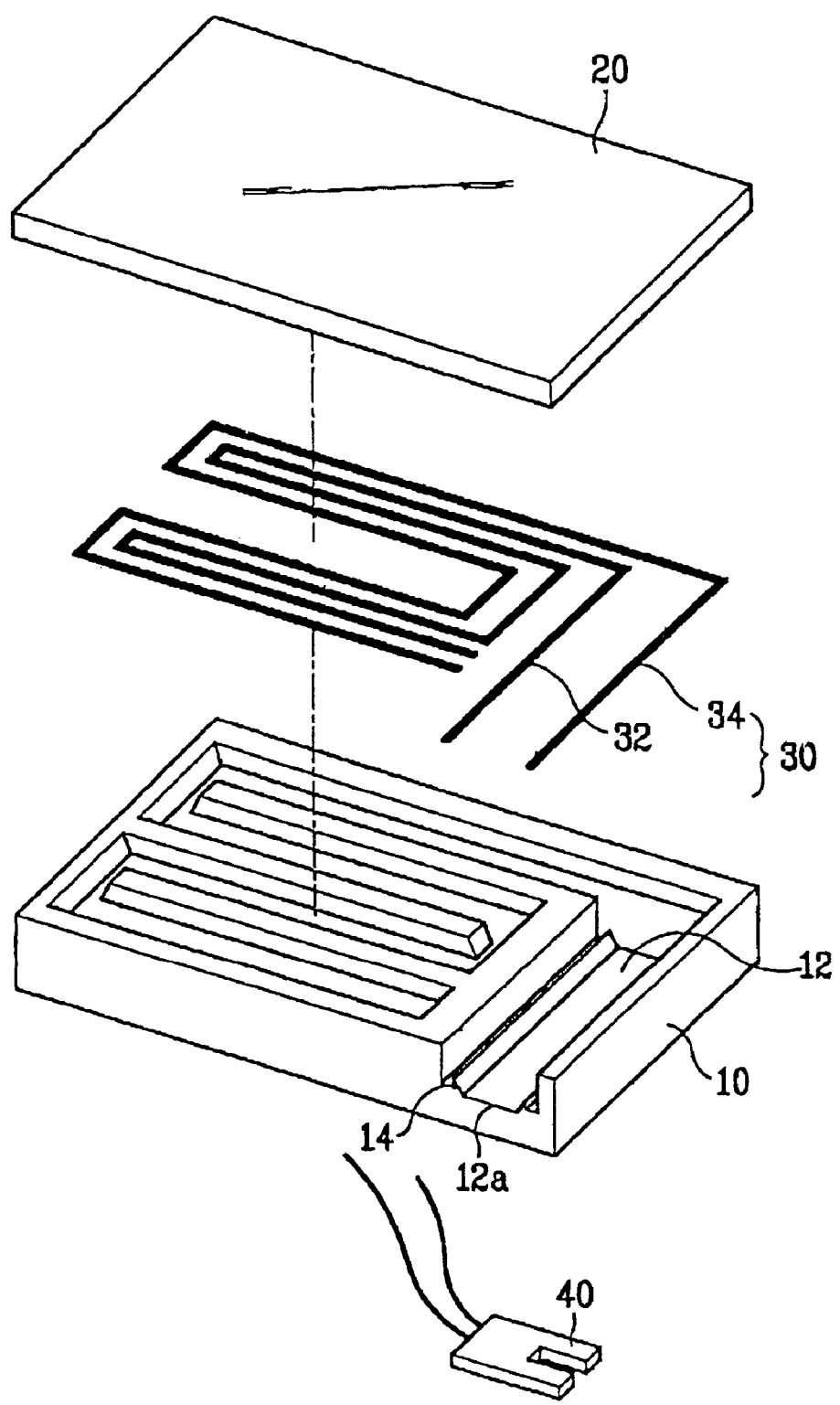
FIG. 5 shows an assembly view of a flat lamp.

In FIG. 5, an electric field generating means is formed by inserting wires 32 and 34 for a cathode electrode and an anode electrode in wire-installing grooves 14 of a channel 12 formed at a bottom 10. A cover 20 is placed upon an upper junction surface 18 of the bottom 10 and an arc-discharging gas is injected under constant pressure into the channel 12 through the open surface 12a. Then, the channel 12 is sealed.

Figure 6:
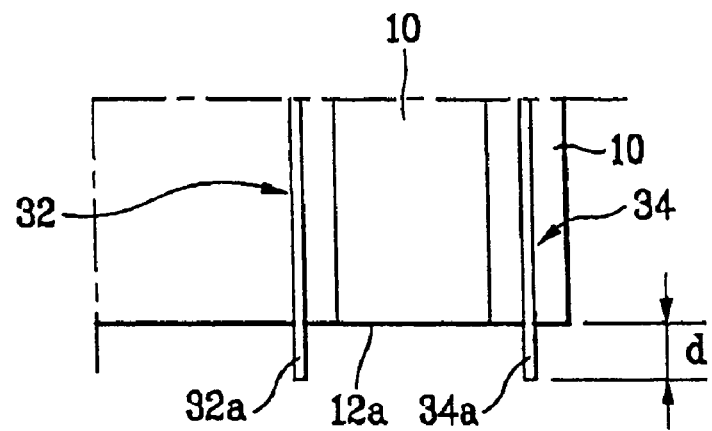
FIG. 6 shows a wire soldering portion of a flat lamp.

In FIG. 6, the wires 32 and 34 extend to a predetermined length "d" external to the open surface 12a of the channel 12 (in FIG. 5), in which soldering margins 32a and 34a are respectively provided. Next, the soldering margins 32a and 34a corresponding to the wires 32 and 34 are soldered with wires extending from the connector 40, whereby the assembly process is completed.

The flat lamp fabricated by this assembly process produces light by the application of an electric field, wherein electrons emitted from the cathode 32 travel toward the anode 34 by the application of a voltage from electric field generating means 30 via the connector 40. Accordingly, the electrons collide with the arc-discharging gas disposed in the channel 12 to produce a plasma that generates ultraviolet light. The ultraviolet light then stimulates the fluorescent material coated on the cover 20, thereby producing visible rays.

Compared to the distance between the cathode and anode in the related art, the distance between the cathode and anode 32 and 34 is approximately the width of the channel 12 in the flat lamp according to the present invention, thereby greatly reducing the distance necessary for generating the electric field. As a result of reducing the distance between the cathode and anode, the initial response time for luminescence after applying power to the electric field generating means 30 is greatly reduced, thereby increasing the life-span of the lamp. Furthermore, the flat lamp of the present embodiment provides a large-sized light source that is not limited by the length of the channel 12. The size of the flat lamp of the prior art is heavily dependent upon the channel length that is determined by the distance between the cathode electrode and anode electrode. Since the flat lamp of the related art places the cathode electrode and anode electrode at opposite ends of the channel, the total length of the channel determines the overall size of the flat lamp. Furthermore, the applied voltage required to ignite the arc-discharge plasma is dependent upon the relative placement of the cathode electrode and anode electrode. In contrast, the flat lamp according to the present embodiment maintains a constant distance between the cathode electrode 32 and the anode electrode 34 even though the channel 12 is elongated. Accordingly, the applied voltage necessary to ignite the arc-discharge plasma of the flat lamp of the present embodiment is significantly reduced, thereby reducing the dependence between the lamp size and the required voltage.

Figure 7:
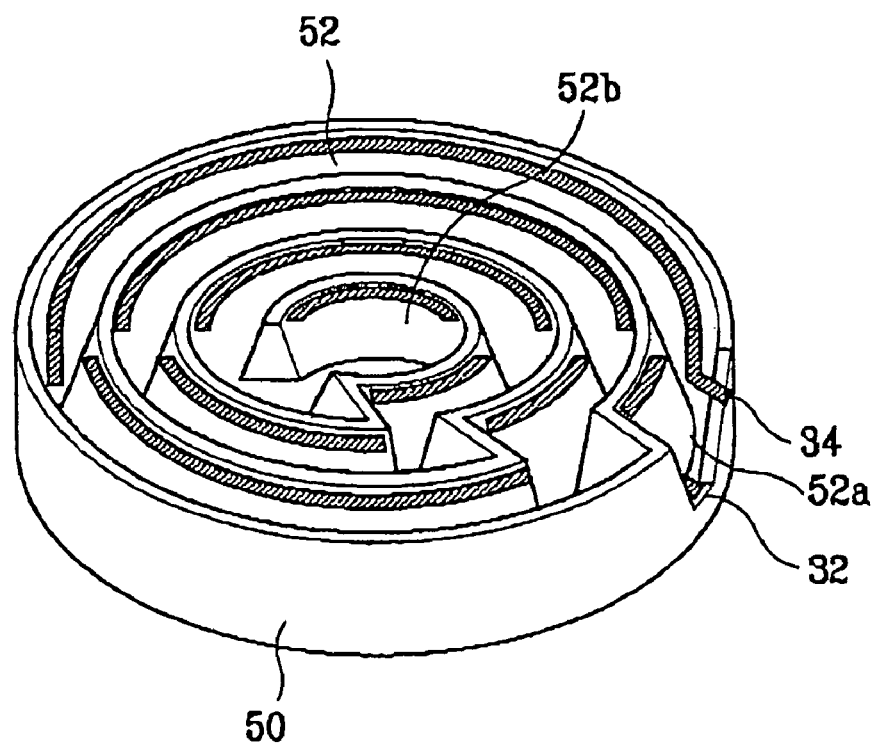
FIG. 7 shows a flat lamp for emitting lights to a surface area according to another embodiment of the present invention.

FIG. 7 shows a flat lamp for emitting lights to a surface area according to another embodiment of the present invention.

In FIG. 7, a channel 52 having an electric field generating means, i.e., wires 32 and 34, is formed on an upper surface of a round-shaped bottom 50. The channel 52 formed in the bottom 50 has a volute configuration winding counterclockwise from an open surface 52a at an end of a circumferential surface of the bottom to a closed surface 52b at a center thereof. A pair of wires 32 and 34 constitute an electric field generating means and are formed along opposite sides of the channel 52 to constitute a cathode electrode and an anode electrode, respectively. Alternatively, when films are used for the electric field generating means, opposite sides of the channel 52 are coated with films for the cathode electrode and the anode electrode, respectively. Additionally, other components and functions of the flat lamp are identical to those of the previous embodiment of the present invention.

Figure 8:
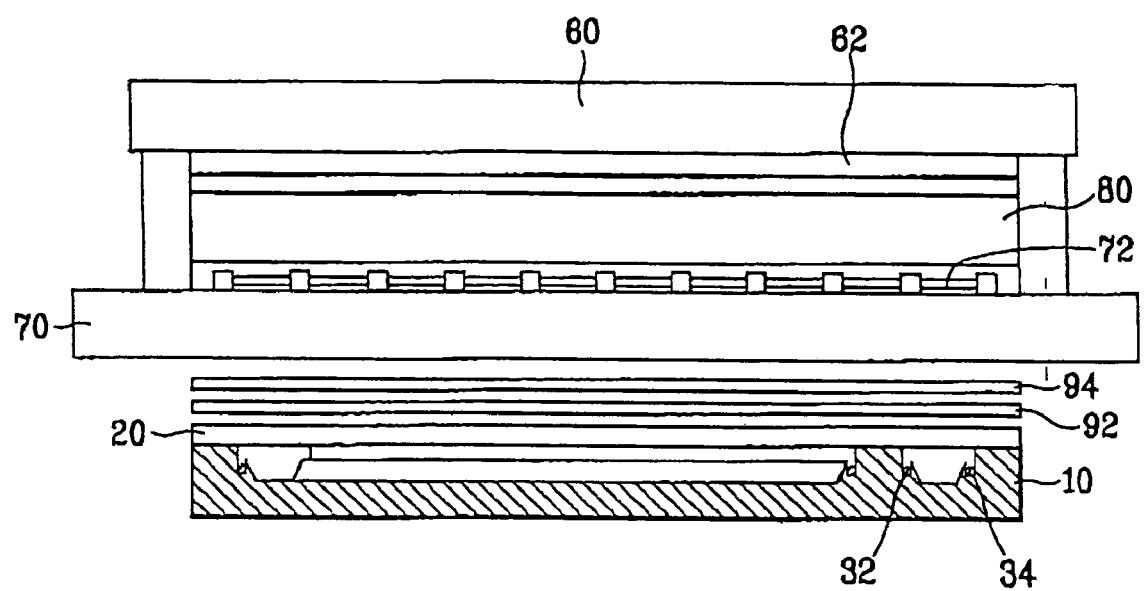
FIG. 8 shows a LCD device in which a flat lamp for emitting lights to a surface area is applied according to the present invention.

FIG. 8 shows a LCD device implementing a flat lamp for emitting light according to the present invention.

In FIG. 8, a liquid crystal display according to the present invention includes an LCD panel that presents image data and a backlight assembly that is placed at a rear surface of the LCD panel to provide a light source. The LCD panel includes a lower glass substrate 70 on which thin film transistors 72 are formed, an upper glass substrate 60 on which a color filter 62 is formed, and a liquid crystal layer 80 that is injected between the lower glass substrate 70 and the upper glass substrate 60. The backlight assembly, which is installed in a lower part of the lower glass substrate 70, includes a cover 20 of which a rear surface is coated with a fluorescent material, a bottom 10 coupled with the rear surface of the cover and having a channel in which an arc-discharging gas is injected, an electric field generating means disposed along opposite sides of the channel that includes a cathode electrode 32 and an anode electrode 34, and a connector (not shown) that is connected to one end of the electric field generating means to supply electricity.

Since a display plane of the liquid crystal display generally has a rectangular shape, the corresponding shapes of the cover 20 and the bottom 10 are also rectangular. Furthermore, the shape of the channel formed in the bottom 10 maybe altered in accordance with the various embodiments described above.

Referring to FIG. 8, a diffusion plate 92, a prism sheet 94 and the like may be formed between the LCD panel and the backlight assembly, i.e., on an upper part of the cover 20, thereby providing a light source having more uniform brightness and wider visible angle.

As a flat lamp for emitting light is applied to the liquid crystal display having the above embodiments, high brightness is attained by providing a uniform light source having high directiveness over an entire display surface. Moreover, the liquid crystal display may be driven with lower power consumption by implementing a flat lamp according to the present invention. Furthermore, the liquid crystal display according to the present invention can provide a large-sized display screen by enlarging the size of a backlight assembly.

It will be apparent to those skilled in the art that various modifications and variations can be made in the flat lamp and liquid crystal display using the flat lamp of the present invention without departing from the spirit of scope of the invention. Thus, it is intended that the present invention covers the modifications and variations of this invention provided they come within the scope of the appended claims and their equivalents.

What is claimed is:

1. A flat lamp, comprising:
    a bottom having a single channel including a plurality of bends uniformly crossing an entire surface thereof;
    an arc-discharging gas within the channel;
    a cover disposed upon an upper junction surface of the bottom, the cover coated with a fluorescent material; and an electric field generating means for generating an electric field, wherein the electric field generating means is placed along opposing lateral sides of the channel, wherein the bottom and the cover are round shaped.

2. The flat lamp according to claim 1, wherein the channel has a volute shape elongated from an open surface along a circumferential surface of the bottom toward a center of the bottom.

3. The flat lamp according to claim 1, wherein the electric field generating means includes wires.

4. The flat lamp according to claim 3, wherein grooves of a predetermined depth are formed at both of the opposing lateral sides of the channel.

5. The flat lamp according to claim 1, wherein the electric field generating means includes at least two films, wherein each of the at least two films is formed upon the opposing lateral sides of the channel.

6. The flat lamp according to claim 1, wherein the cover is one formed of at least a glass material, a heat-resistant resin, a metal and an oxide.

7. The flat lamp according to claim 1, wherein the electric field generating means includes a cathode and an anode, a first distance between the cathode and the anode being constant.

* * * * *